United States Patent
Kitano et al.

(10) Patent No.: US 12,306,560 B2
(45) Date of Patent: May 20, 2025

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventors: Yuji Kitano, Kanagawa (JP); Makoto Souma, Kanagawa (JP); Naoko Kasai, Kanagawa (JP); Yutaro Yoshida, Kanagawa (JP); Masatsugu Toyonori, Kanagawa (JP); Yasutomo Tsuji, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/441,115

(22) Filed: Feb. 14, 2024

(65) Prior Publication Data

US 2024/0288800 A1    Aug. 29, 2024

(30) Foreign Application Priority Data

Feb. 21, 2023    (JP) .................................. 2023-025006
Jan. 19, 2024    (JP) .................................. 2024-006660

(51) Int. Cl.
*G03G 15/16*    (2006.01)
*C08K 3/22*    (2006.01)
*C08L 33/08*    (2006.01)

(52) U.S. Cl.
CPC ............. *G03G 15/162* (2013.01); *C08K 3/22* (2013.01); *C08L 33/08* (2013.01); *C08K 2003/2231* (2013.01); *C08K 2201/001* (2013.01)

(58) Field of Classification Search
CPC .................... G03G 15/162; C08K 3/22; C08K 2003/2231; C08K 2201/001; C08L 33/08
See application file for complete search history.

(56) References Cited

U.S. PATENT DOCUMENTS

| | | |
|---|---|---|
| 9,423,727 B2 | 8/2016 | Yoshida |
| 9,442,430 B2 | 9/2016 | Hamana |
| 9,575,439 B2 | 2/2017 | Tsuji |
| 9,606,478 B2 | 3/2017 | Tsuji |
| 10,551,771 B2 | 2/2020 | Uchida |
| 10,768,557 B2 | 9/2020 | Okamoto |
| 10,859,951 B2 | 12/2020 | Matsuo |
| 11,372,351 B2 | 6/2022 | Miyauchi |

(Continued)

FOREIGN PATENT DOCUMENTS

| | | |
|---|---|---|
| JP | 2005-187580 A | 7/2005 |
| JP | 2007-171273 A | 7/2007 |

(Continued)

*Primary Examiner* — Joseph S Wong
(74) *Attorney, Agent, or Firm* — VENABLE LLP

(57) ABSTRACT

An electrophotographic member having a base layer and a surface layer, wherein the surface layer comprises a binder resin; and a plurality of particles comprising a conductive tin oxide, in the binder resin, a content ratio of the particles comprising a conductive tin oxide, in the surface layer, is 2.0 to 10.0 vol %, and a value of an L function denoting a relationship of a distribution of the particles comprising a conductive tin oxide, as observed from a surface of the surface layer, is always positive in a range of 300 nm to 1 μm of a distance from barycentric coordinates of the particles.

12 Claims, 5 Drawing Sheets

(56) References Cited

U.S. PATENT DOCUMENTS

| | | | |
|---|---|---|---|
| 11,415,913 B2 | 8/2022 | Kasai | |
| 2014/0377695 A1 | 12/2014 | Kameyama | |
| 2015/0346618 A1 | 12/2015 | Egawa | |
| 2017/0210719 A1* | 7/2017 | Nishioka | C08G 59/28 |
| 2018/0011415 A1* | 1/2018 | Narita | G03G 15/0216 |
| 2022/0221806 A1* | 7/2022 | Kubo | G03G 15/1615 |

FOREIGN PATENT DOCUMENTS

| | | |
|---|---|---|
| JP | 2007-211155 A | 8/2007 |
| JP | 2010-146995 A | 7/2010 |
| JP | 2015-28613 A | 2/2015 |
| JP | 2015-96570 A | 5/2015 |
| JP | 2016-6158 A | 1/2016 |
| JP | 2022-154143 A | 10/2022 |
| WO | 2012/161191 A1 | 11/2012 |

\* cited by examiner

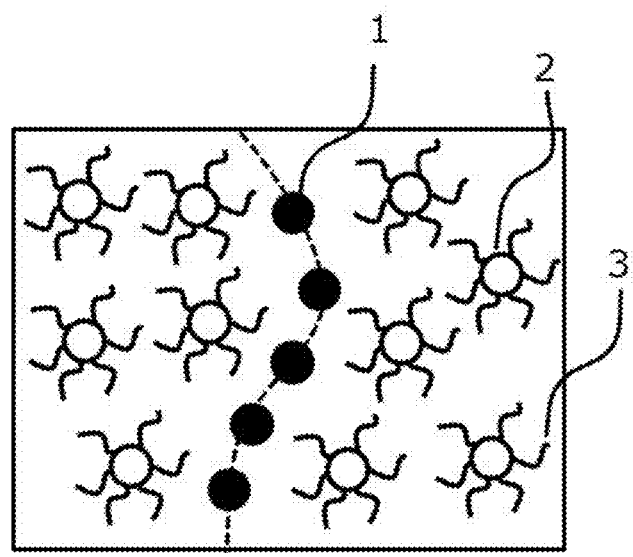
FIG. 1
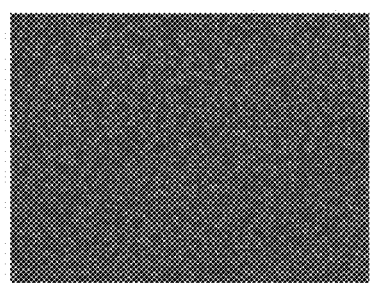 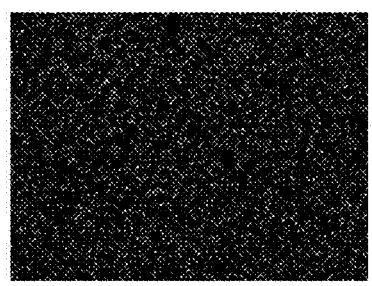
FIG. 2A  FIG. 2B

ELECTROPHOTOGRAPHIC MEMBER AND ELECTROPHOTOGRAPHIC IMAGE FORMING APPARATUS

BACKGROUND OF THE INVENTION

Field of the Invention

The present disclosure relates to an electrophotographic member that is used in the field of electrophotographic image forming apparatuses such as printers and copiers, and to an electrophotographic image forming apparatus provided with such an electrophotographic member as an intermediate transfer member.

Description of the Related Art

An electrophotographic image forming apparatus is provided with an intermediate transfer member, onto which a toner image that has been formed on a photosensitive drum is primary-transferred, and which is for the purpose of secondary transfer of the primary-transferred toner image onto a recording material such as paper. The surface layer of the intermediate transfer member is required to exhibit surface resistivity in a medium resistance range, for the purpose of efficiently eliciting primary transfer and secondary transfer of the toner image.

Japanese Patent Application Publication No. 2016-006158 discloses an electrophotographic member provided with a surface layer containing antimony-doped tin oxide as a conductive agent. Japanese Patent Application Publication No. 2007-171273 discloses a seamless semiconductive belt having a surface layer containing a conductive agent in the form of particles that contain antimony-doped tin oxide (hereafter also referred to as "antimony-doped tin oxide particles").

SUMMARY OF THE INVENTION

Studies by the inventors have revealed that a surface layer comprising a conductive agent in the form of conductive tin oxide particles (hereafter also referred to as "conductive tin oxide particles") such as antimony-doped tin oxide particles tends to exhibit higher surface resistivity than that in a case where a conductive agent such as zinc antimonate is used. In order to lower surface resistivity it is therefore necessary to increase the content of the conductive agent. However, adding a large amount of a conductive agent to the surface layer may result in decreased strength of the surface layer. On the other hand, conductive tin oxide particles are comparatively inexpensive, and are readily procurable.

Therefore, at least one aspect of the present disclosure, premised on the use of conductive tin oxide particles as a conductive agent, aims at providing an electrophotographic member such that the surface resistivity thereof can be sufficiently lowered while keeping the content of conductive tin oxide low. At least one aspect of the present disclosure aims at providing an electrophotographic image forming apparatus that can form high-quality electrophotographic images.

At least one aspect of the present disclosure provides an electrophotographic member having a base layer and a surface layer,
wherein the surface layer comprises
a binder resin; and
a plurality of particles comprising a conductive tin oxide, in the binder resin,
a content ratio of the particles comprising a conductive tin oxide, in the surface layer, is 2.0 to 10.0 vol %, and
a value of an L function denoting a relationship of a distribution of the particles comprising a conductive tin oxide, as observed from a surface of the surface layer, is always positive in a range of 300 nm to 1 μm of a distance from barycentric coordinates of the particles.

At least one aspect of the present disclosure provides an electrophotographic image forming apparatus comprising:
an image bearing member supporting a toner image thereon; and
an intermediate transfer member onto which the toner image formed on the image bearing member is primary-transferred, and which secondary-transfers, onto a recording material, the primary-transferred toner image,
wherein the intermediate transfer member is the above electrophotographic member.

At least one aspect of the present disclosure allows obtaining an electrophotographic member including a surface having reduced surface resistivity while curtailing the content of conductive tin oxide. At least one aspect of the present disclosure allows obtaining an electrophotographic image forming apparatus capable of forming high-quality electrophotographic images. Further features of the present invention will become apparent from the following description of exemplary embodiments with reference to the attached drawings.

BRIEF DESCRIPTION OF THE DRAWINGS

FIG. 1 is an explanatory diagram of the underlying mechanism of the effect of the present disclosure;
FIG. 2A is a surface SEM observation image of a surface layer, and FIG. 2B a binarized image of the surface SEM observation image.

DESCRIPTION OF THE EMBODIMENTS

Figure 3:
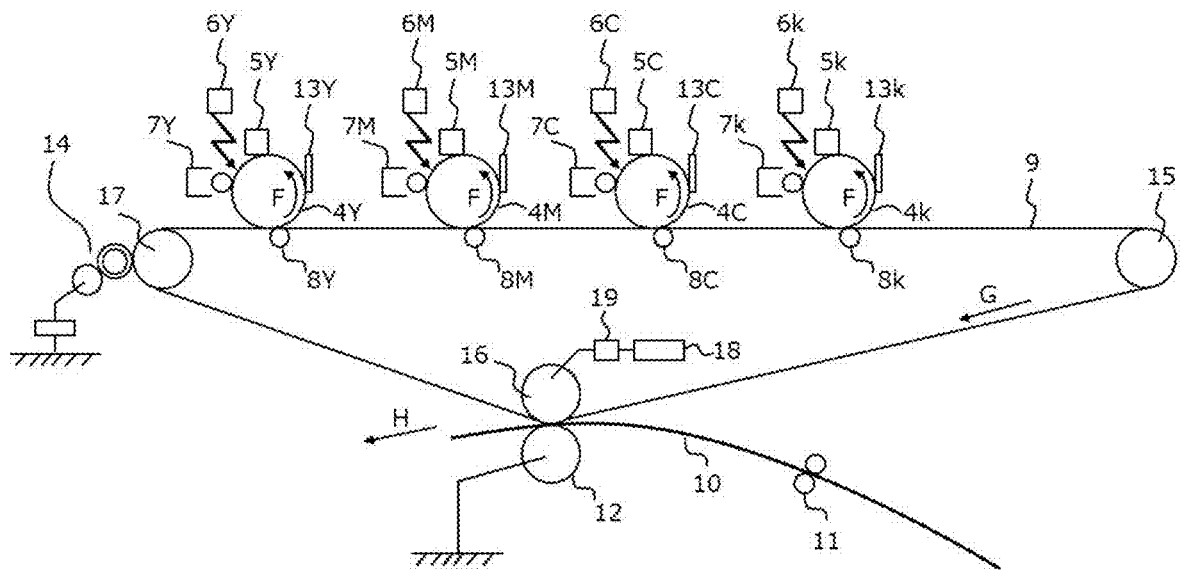
FIG. 3 is a schematic diagram of an example of an electrophotographic image forming apparatus.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

Further, in the present disclosure, "Ω/□", which is a unit of surface resistivity, means "Ω/square".

In the present disclosure the term conductive tin oxide particles denotes particles having a volume resistivity (temperature: 25° C., relative humidity: 55%) of 0.01 to 100 Ω·cm, in particular 1 to 5 Ω·cm, in a powder compact having been pressed under a load of 9.8 MPa. Examples of such conductive tin oxide particles include tin oxide particles comprising antimony and tin oxide particles comprising phosphorus. The particles comprising a conductive tin oxide preferably comprise an antimony. More specifically, antimony-doped tin oxide particles and phosphorus-doped tin oxide particles are preferred herein. Examples of antimony-doped tin oxide particles of a 9.8 MPa powder compact and having a volume resistivity in the range of 1 to 5 Ω·cm include for instance "SN-100P" (product name, by Ishihara Sangyo Kaisha, Ltd.).

To measure the volume resistivity of the conductive tin oxide, for instance there can be measured the density of a molded body obtained through pressing and molding of conductive tin oxide particles under a load of 9.8 MPa, followed by a measurement, in accordance with a resistivity test method relying on a four-probe method pursuant to Japanese Industrial Standards (JIS) K7194: 1994, while a state is maintained in which the molded body is pressed under a load of 9.8 MPa. The measurement can also be carried out in an environment at a temperature of 25° C. and a relative humidity of 55%, under a pressure of 9.8 MPa, using an automatic powder resistance measurement system (product name: MCP PD600; by Nittoseiko Analytech Co., Ltd.).

The inventors found that even when conductive tin oxide particles are used as a conductive agent in the surface layer of an electrophotographic member, the surface resistivity of the surface layer can be made sufficiently lower by adopting the following configuration.

In an electrophotographic member having a base layer and a surface layer, the surface layer comprises a binder resin and conductive tin oxide particles. A content ratio of conductive tin oxide particles in the surface layer is 2.0 to 10.0 vol %. A value of an L function, obtained from Ripley's K function and denoting a relationship of a distribution of the conductive tin oxide particles as observed from a surface of the surface layer, is always positive in a range of 300 nm to 1 μm of a distance from barycentric coordinates of the particles.

That is, the inventors found that in order to improve the conductivity of the surface layer while keeping the content of the conductive tin oxide particles in the surface layer low it is effective to cause the particles to be distributed, in the surface layer, close to the range of the dispersion diameter (diameter) of the conductive tin oxide particles. The reasons underlying this finding are unclear, but are deemed to involve the fact that the conductive tin oxide particles can be thus caused to contribute more efficiently to constructing conductive paths (see FIG. 1; the dotted line in FIG. 1 represents conductive paths).

The reference symbols in FIG. 1 denote the following.

Reference symbol 1: conductive tin oxide particles, reference symbol 2: particles comprising a fluororesin, reference symbol 3: dispersing agent of the particles comprising a fluororesin.

The distribution state of conductive tin oxide particles in the surface layer can be quantified using the L function of spatial statistics. In the field of spatial statistics, spatial distributions of points can be divided into three kinds of distribution: random distributions (Complete Spatial Randomness (CSR)), concentrated distributions (cluster-type distributions), and regular distributions (regularly spaced distributions). A random distribution is a spatial distribution of points that arises when points are each disposed, with equal probability, at any location in any region, independently from the other points. A concentrated distribution is a spatial distribution in which points are clustered in a specific region. A regular distribution (regularly spaced distribution) is a spatial distribution in which points are distributed while keeping a given distance relative to each other.

The L function will be explained next. Firstly, Ripley's K function is defined as follows.

$$K(d) = E/\lambda$$

Herein, E is the number of other points encompassed within a circle of radius d centered on a randomly selected point. Further, $\lambda$ is the density of points in an entire region (average density).

That is, the value of K(d) which is Ripley's K function is calculated by dividing the average number of other points encompassed in a circle of radius d, centered around a randomly selected point, by the density of points in the entire region (average density). Points that are randomly scattered on a finite plane obey a Poisson distribution. When the points are randomly distributed according to a Poisson distribution, the expected value of the number of other points within a circle of radius d is the average density $\lambda$ multiplied by the surface area $\pi d^2$ of the circle, as per the expression below:

$$K(d) = \pi d^2$$

Ripley's K function is standardized and made into a linear function, i.e. the L function. The L function L(d) is expressed as follows.

$$L(d) = \sqrt{(K(d)/\pi)} - d$$

Given the index of the L function, L(d)=0 holds when the points are randomly distributed, regardless of the radius d. Further, L(d) takes on a positive value when the spatial distribution is a concentrated distribution (cluster-type distribution), and takes on a negative value when the spatial distribution is a regular distribution (regular distribution (regularly spaced distribution). That is, in a case where the number of other points within a given radius d is larger than in a random distribution, L(d) takes on a positive value, whereas in a case where the number of other points is smaller than in a random distribution, L(d) takes on a negative value.

The presence of numerous conductive agent particles close to each other can be evaluated as the distribution state of conductive tin oxide particles which are a conductive agent, on the basis of the fact that the L function is positive for a small radius d. The dispersion diameter of the conductive tin oxide particles in the surface layer is ordinarily distributed in the range from 300 nm to 1 μm. In the present disclosure, therefore, the L function for the radius d is evaluated in a range such that the distance for the barycentric coordinates lies in the range of 300 nm to 1 µm, centered on the barycentric coordinates of one particle (group) of interest.

In a case for instance where the dispersion diameter of the conductive tin oxide particles in the surface layer is 300 nm, a feature wherein that the L function is positive when the distance from the barycentric coordinates is 300 nm to 1 µm signifies that particles (groups) having barycentric coordinates in the range of distance of 300 nm to 1 µm from the barycentric coordinates of the particle (group) of interest are more numerous than in the case of a random distribution. The distance from the barycentric coordinates may be referred hereafter to as interparticle distance. Therefore, a feature wherein the value L(d) of the L function is always positive in a range of interparticle distance of 300 nm to 1 µm signifies that conductive tin oxide particles are distributed, in the surface layer, clustered within a range of interparticle distance of 300 nm to 1 µm.

The surface layer containing conductive tin oxide particles can be a dry film of a coating film of a coating material resulting from dispersing the conductive tin oxide particles in a binder resin or in a starting material of the binder resin, or a cured film of such a coating film.

In a surface layer formed using a coating material having conductive tin oxide particles dispersed therein, the distribution state of the conductive tin oxide particles depends on the dispersion state of the conductive tin oxide particles in the coating material.

Ordinarily, conductive tin oxide particles in coating materials are dispersed to a high degree using a dispersing agent for the purpose of preventing variability in the quality of the coating film. The distribution state of conductive tin oxide particles in the surface layer formed using such a coating material is deemed to be random, i.e. L(d)=0 holds. The distribution state of conductive tin oxide particles in a surface layer formed using a coating material resulting from aggregation of conductive tin oxide particles when allowed to stand for a long period of time is deemed to be a state in which conductive tin oxide particles are aggregated at regular intervals, i.e. a state in which L(d)<0 holds.

In order to allow a small amount of conductive tin oxide particles to contribute efficiently and stably to the construction of conductive paths it is effective herein to use particles comprising a fluororesin (hereafter also referred to as "fluororesin particles"), and a dispersing agent of these particles, in the surface layer. The dispersing agent is for instance a fluorine-based dispersing agent in the form of a polymer having a structure represented by Formula (1) and a structure represented by Formula (2), described below. It is deemed that by virtue of the fact that the surface layer comprises thus fluororesin particles and a dispersing agent thereof, the region at which conductive tin oxide particles can be present, in the surface layer, is limited, which allows the conductive tin oxide particles to be distributed to a state of being close to each other.

Evaluation of the Dispersion State of Conductive Agent on the Basis of the L Function An evaluation sample is prepared first. From an arbitrary site of an electrophotographic member there is taken a sample 5 mm long and 5 mm wide, and having a thickness equal to the total thickness of the electrophotographic member.

The surface of the surface layer is then observed using a scanning electron microscope (SEM) (product name: FE-SEM JSM-F100, by JEOL Ltd.), to acquire a surface image (FIG. 2A). Observation conditions include a backscattered electron image mode at 3000 magnifications, and backscattered electron image acquisition conditions include an acceleration voltage of 5.0 kV and a working distance of 6 mm. A significant amount of compositional information is garnered from backscattered electron images, in that the higher the atomic number of an element, the brighter that element appears; herein the conductive tin oxide particles as the conductive agent contain tin having a high atomic number, and hence the conductive tin oxide particles are observed with high brightness.

The obtained image (42.7 µm×32.0 µm) is then subjected to black-and-white binarization using image processing software, so that conductive agent portions are rendered white, and acrylic resin portions other than the conductive agent are rendered black (FIG. 2B). Through binarization such that from the high-brightness side the vol % fraction i.e. the area % fraction of the conductive agent is rendered white and the rest black, it becomes possible to obtain an image in which there are extracted, in the form of white portions, only the conductive agent. For instance "MATLAB" (product name, by Math Works Inc.) can be used herein as the image processing software.

The concrete conditions for binarization include loading first a SEM image into the image processing software, and converting then the SEM image into a 256-gradation luminance image. Binarization for separating only the conductive agent portion into white and the binder resin portion into black is performed next. In this case a threshold value is established so that the occupancy area ratio of white portions (ratio of the number of pixels taken up by white portions relative to the total number of pixels in one SEM image) after binarization matches the content ratio of the conductive tin oxide particles. Herein respective values of mass % of the binder resin, the particles comprising a fluororesin and the conductive tin oxide particles are worked out by thermogravimetric analysis (TGA analysis) of the surface layer; the content ratio of the conductive tin oxide particles in the surface layer can then be calculated on the basis of the respective densities of the foregoing.

Plane barycentric coordinates values (X coordinate, Y coordinate) as well as a number-average particle diameter of the conductive tin oxide particles are determined from the obtained binarized image.

Specifically, for instance plane barycentric coordinates of respective particles are worked out relying on a regionprops function that involves performing a shape measurement of an image region, for the portions (white portions) of the conductive tin oxide particles within the binarized image, using the above image processing software.

To work out the number-average particle diameter, a circle-equivalent diameter of the particles is calculated first. The circle-equivalent diameter of the particles denotes the diameter of a circle having the same surface area as the surface area of that particle. Specifically, the number of pixels that make up each particle is calculated, and the actual surface area of the particle is calculated by multiplying this number of pixels by the surface area of one pixel.

The number of pixels made up of by respective particles in the SEM images used in the examples described further on was multiplied by 0.15×0.15 µm$^2$, since the length of one side of one pixel corresponds to 0.15 µm.

The circle-equivalent diameter is calculated by working out the diameter of a circle having that surface area. A number-average dispersion diameter is then calculated by dividing the sum total of the circle-equivalent diameters of the particles obtained above, by the total number of particles.

Next, Ripley's K function is calculated first, in accordance with the expression below, on the basis of the plane barycentric coordinate values (X coordinate, Y coordinate) of the conductive tin oxide particles.

$$K(d) = \frac{1}{\lambda}\left(\frac{1}{n}\sum_{i \neq j}\frac{1}{w_i}I_d(i,j)\right)$$

In the expression, i is an index denoting each particle in the image, λ is the average density of particles in the image, and n is the number of particles in the image. Further, $w_i$ is a ratio (surface area B/surface area A) of "the surface area A of a circle i of radius d centered on the barycentric coordinates of the particle i" and "the surface area B of the portion, included in the image, of a circle i of radius d centered on the barycentric coordinates of the particle i"). Herein $w_i$ is used for correcting underestimation arising from the absence of particles outside the image when the particle i is present near the image boundary. Further, $I_d(i, j)$ is a function that takes on a value of 1 when the barycentric coordinates of a particle j lie within a circle of radius d centered on the barycentric coordinates of the particle i, and takes on a value 0 otherwise. In the present disclosure the radius d is a discrete function that takes on a value for each pixel (0.033 µm) of the image.

A value L(d) of the L function for an interparticle distance d (radius d) in the range of 300 nm to 1 µm was worked out in accordance with the expression below, on the basis of Ripley's K function.

$$L(d) = \sqrt{\frac{K(d)}{\pi}} - d$$

A value of the L function being always positive in the range from the interparticle distance of 300 nm to 1 µm signifies herein that the above value of L(d) is always positive in the range from 300 nm to 1 µm of the interparticle distance d.

In a range within which the radius d is smaller than the minimum dispersion diameter of the conductive agent, no other conductive agent can be present therein, and hence the value L(d) of the L function becomes larger negatively.

As pointed out above, incorporating fluororesin particles and a dispersing agent thereof is an effective method for rendering the value of the L function always positive, in the range of interparticle distance of 300 nm to 1 µm.

In the range of interparticle distance of 300 nm to 1 µm the maximum value of the L function is preferably 0.3 or higher, and is more preferably 0.3 to 5.0, and yet more preferably 0.3 to 2.0. In the range of interparticle distance of 300 nm to 1 µm, preferably the value of the L function exceeds 0 at all times, while being no greater than 5.0, and lies in the range of 0.3 to 5.0, or 0.3 to 2.0.

An electrophotographic member and an electrophotographic image forming apparatus (hereafter also simply referred to as "image forming apparatus") according to an embodiment of the present disclosure will be explained in detail below on the basis of a concrete configuration.

Overview of the Configuration of an Electrophotographic Member

An example of the electrophotographic member of the present embodiment will be explained below. The electrophotographic member is used stretched over a plurality of rollers, and hence may have an endless belt shape. An endless belt shape denotes herein for instance a shape resulting from splicing a sheet or film-like molded product into a cylindrical shape, and refers to a shape that can be stretched around, and rotated by, a plurality of rollers. A seamless shape without seams is preferred from the viewpoint of reducing belt thickness unevenness, from among such endless belt shapes.

The electrophotographic member has at least a base layer and a surface layer. The electrophotographic member may further have for instance an inner surface layer. Examples of the inner surface layer include a resin layer for reinforcing the base layer, and a conductive layer for imparting conductivity to the inner peripheral surface of the electrophotographic member.

The base layer and the surface layer will be explained in detail next.

Base Layer of the Electrophotographic Member

The base layer may have an endless shape. For instance the base layer comprises a polyester resin as a binder resin. Such a base layer may be for instance a base layer resulting from splicing a semiconductive film in which a conductive agent is incorporated into a resin comprising a polyester resin, or may be a cylindrical seamless belt.

The polyester resin can be obtained from a polycondensate of a dicarboxylic acid component and a dihydroxy component, a polycondensate of an oxycarboxylic acid component or a lactone component, or a polycondensate that utilizes a plurality of the foregoing components. The polyester resin may be a homopolyester or a copolyester.

Examples of the dicarboxylic acid component include aromatic dicarboxylic acids, alicyclic dicarboxylic acids, aliphatic dicarboxylic acids, as well as derivatives of these dicarboxylic acids. Examples of aromatic dicarboxylic acids include aromatic dicarboxylic acids having from 8 to 16 carbon atoms (C8 to C16) per molecule. Concrete examples include terephthalic acid, isophthalic acid, phthalic acid, naphthalenedicarboxylic acids such as 2,6-naphthalenedicarboxylic acid, diphenyldicarboxylic acid, diphenyl ether dicarboxylic acid, diphenylmethanedicarboxylic acid and diphenylethanedicarboxylic acid. Examples of the alicyclic dicarboxylic acid include for instance C4 to C10 cycloalkanedicarboxylic acids such as cyclohexanedicarboxylic acid. Examples of aliphatic dicarboxylic acids include C4 to C12 aliphatic dicarboxylic acids such as succinic acid, adipic acid, azelaic acid and sebacic acid. Examples of derivatives of these dicarboxylic acids include derivatives capable of forming esters (for instance lower alkyl esters such as dimethyl esters, acid anhydrides, and acid halides such as acid chlorides).

These dicarboxylic acid components can be used singly or in combinations of two or more types. Preferred dicarboxylic acid components are herein aromatic dicarboxylic acids, and more preferred are terephthalic acid, isophthalic acid and naphthalenedicarboxylic acid, from the viewpoint of crystallinity and heat resistance.

Examples of the above dihydroxy component include aliphatic diols, alicyclic diols and aromatic diols.

Examples of aliphatic diols include C2 to C10 alkylene diols such as ethylene glycol, propylene glycol, 1,3-butanediol, 1,4-butanediol, neopentyl glycol and hexanediol. Examples of alicyclic diols include C4 to C12 alicyclic diols such as cyclohexanediol and cyclohexanedimethanol. Examples of aromatic diols include C6 to C20 diols such as hydroquinone, resorcinol, dihydroxybiphenyl, naphthalene diol, dihydroxydiphenyl ether and 2,2-bis(4-hydroxyphenyl) propane (bisphenol A). Other examples include alkylene oxide adducts of the above aromatic diols (for instance C2 to C4 alkylene oxide adducts of bisphenol A). Other examples include polyoxyalkylene glycols (for instance polyoxy C2-C4 alkylene glycols such as diethylene glycol, polyoxyethylene glycol, polyoxypropylene glycol and polytetramethylene ether glycol).

These dihydroxy components may be derivatives (for instance alkyl groups, alkoxyl groups or halogen-substituted products) capable of forming esters. These dihydroxy components can be used singly or in combinations of two or more types. Preferred among these dihydroxy components are alkylene diols (in particular C2 to C4 alkylene diols) and alicyclic diols, for instance from the viewpoint of crystallinity and heat resistance.

Examples of oxycarboxylic acid components include the following. Oxycarboxylic acids such as oxybenzoic acid, oxynaphthoic acid, diphenyleneoxycarboxylic acid and 2-hydroxypropanoic acid, as well as derivatives of these oxycarboxylic acids. These oxycarboxylic acid components can be used singly or in combinations of two or more types.

Lactone components include C3 to C12 lactones such as propiolactone, butyrolactone, valerolactone and caprolactone (for instance ¿-caprolactone). These lactone components can be used singly or in combinations of two or more types.

Furthermore, a polyfunctional monomer may be used concomitantly in an amount such that crystallinity and heat resistance are preserved. Examples of polyfunctional monomers include polyvalent carboxylic acids such as trimellitic acid, trimesic acid and pyromellitic acid, as well as polyhydric alcohols such as glycerin, trimethylol propane, trimethylol ethane and pentaerythritol. Polyesters having branched or crosslinked structures of such polyfunctional monomers can also be utilized.

As the polyester resin there can be used a polyester resin resulting from polycondensation of the above components (dicarboxylic acid component and dihydroxy component, oxycarboxylic acid component, lactone component or a plurality of the foregoing components). At least one selected from the group consisting of polyalkylene terephthalates, polyalkylene naphthalates and block/random copolymers of polyalkylene terephthalates and polyalkylene isophthalates, is preferred herein, from the viewpoint of for instance crystallinity and heat resistance. Examples of copolymers include block copolymers and random copolymers. The number of carbon atoms of the alkylenes in polyalkylene terephthalate, polyalkylene isophthalate and polyalkylene naphthalate is preferably from 2 to 16, from the viewpoint of crystallinity and heat resistance. Yet more preferably, the copolymer is at least one selected from the group consisting of polyethylene terephthalate, block/random copolymers of polyethylene terephthalate and polyethylene isophthalate, and polyethylene naphthalate.

The polyester resin may be a blend or alloy of two or more types. Concrete examples of polyethylene naphthalate include commercially available TN-8050SC (product name: by Teijin Limited) and TN-8065S (product name: by Teijin Limited). Examples of polyethylene terephthalate include commercially available TR-8550 (product name: by Teijin Limited), and examples of a copolymer of polyethylene terephthalate and polyethylene isophthalate include commercially available PIFG30 (product name: by Bell Polyester Products, Inc.).

The intrinsic viscosity of the polyester resin is preferably 1.4 dl/g or lower, and is more preferably from 0.3 dl/g to 1.2 dl/g and yet more preferably from 0.4 dl/g to 1.1 dl/g. Drops in flowability at the time of molding can be efficiently prevented when the intrinsic viscosity is 1.4 dl/g or lower. Strength and durability can be efficiently ensured if the intrinsic viscosity is 0.3 dl/g or higher. The intrinsic viscosity of the polyester resin is a value measured using o-chlorophenol as a dilution solvent of polyester resin, with the concentration of the o-chlorophenol solution of the polyester resin set to 0.5 mass % and the temperature set to 25° C.

The content of the polyester resin is preferably 50 mass % or higher, in particular 60 mass % or higher, and more preferably 70 mass % or higher, relative to the total amount of the base layer. Drops in the durability in the electrophotographic member can be efficiently prevented if the above content is 50 mass % or higher.

Nonionic and ionic conductive agents can be used as a conductive agent in the base layer. A polymer-type conductive agent and a low-molecular-type conductive agent can be used as the conductive agent. Among polymer-type conductive agents, for instance a polyether ester amide, polyethylene oxide-epichlorohydrin or polyether ester can be used as a nonionic conductive agent. As a polymer-type ionic conducting agent there can be used for instance a quaternary ammonium group-containing acrylate polymer, as a cationic conductive agent, or a polystyrene sulfonic acid, as an anionic conductive agent.

For instance a derivative containing an ether group, or a derivative containing an ether ester, can be used as a nonionic low-molecular conductive agent. Low-molecular ionic conductive agents include primary to tertiary ammonium salts, quaternary ammonium salts as well as deviates thereof, as cationic conducting agents, and for instance anionic carboxylates, sulfate ester salts, sulfonate salts and phosphate ester salts, as anionic conducting agents.

These polymer-type or low-molecular conductive agents can be used singly or in combinations of two or more types; among the foregoing, for instance quaternary ammonium salts and sulfonic acid salts, polyether ester amides and the like are preferably used, from the viewpoint of heat resistance and conductivity. The content of conductive agent is not particularly limited. The content of conductive agent may be selected as appropriate within a range such that a desired electrical resistance is obtained.

Additives such as plasticizers, antioxidants, decomposition inhibitors, crystal control agents, roughness control agents, crosslinking agents, pigments, fillers and elastomers may further be added to the base layer, as the case may require.

The base layer can be formed for instance in accordance with the following method. In a case where a thermoplastic resin is used as the resin, then an ionic surfactant as the conductive agent, the resin, and optionally additives as needed are mixed, and the resulting mixture is melted and kneaded using a twin-shaft kneading apparatus, to produce semiconductive pellets. A semiconductive film can then be obtained by extruding the pellets into a sheet, film or seamless belt shape, for instance by melt extrusion. Herein a semiconductive film can be molded by hot press or injection molding, can also be obtained by stretching and blowing a preform having been formed in turn by injection molding.

The thickness of the base layer is preferably from 20 µm to 500 µm, more preferably from 30 µm to 150 µm.

The electrical resistance of the base layer thus obtained exhibits a volume resistivity from $1.0 \times 10^8$ Ω·cm to $1.0 \times 10^{12}$ Ω·cm upon application of 100 V. Preferably, the surface resistivity is from $1.0 \times 10^8$ Ω/square to $1.0 \times 10^{12}$ Ω/square. Through control of electrical resistance so as to lie within these semiconductive regions it becomes possible to suppress defects, in transferred images, caused by insufficient transfer voltage arising from charge-up, in low-humidity environments, or at the time of continuous driving.

Surface Layer of the Electrophotographic Member

The surface layer is provided on the outer peripheral surface of the base layer, for instance for the purpose of eliciting close contact with a contact member such as a photosensitive drum or cleaning blade, and/or for the purpose of preventing blocking. The surface layer may comprise a binder resin, a plurality of conductive tin oxide particles, fluororesin particles, and a dispersing agent for dispersing the fluororesin particles.

As the dispersing agent there can be preferably used for instance a dispersing agent that is a polymer having a structure represented by the following Formula (1) and a structure represented by the following Formula (2).

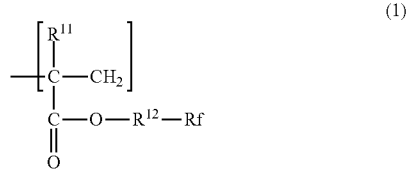

(1)

In Formula (1), $R^{11}$ represents a hydrogen atom or a methyl group, $R^{12}$ represents a single bond or an alkylene group having 1 to 3 carbon atoms, and Rf represents a perfluoroalkyl group having 1 to 6 carbon atoms.

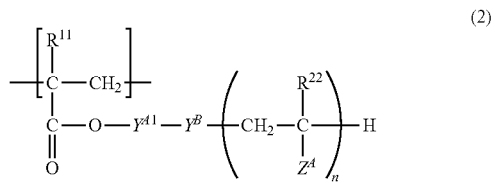

(2)

In Formula (2), $R^{21}$ and $R^{22}$ each independently represent a hydrogen atom or a methyl group; $Y^{A1}$ represents an unsubstituted alkylene group; $Y^{B}$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group derived through combination of one or more selected from among these groups and bonds with —O— or —S—, or a single bond; $Z^{A}$ represents a structure represented by Formula (3), a cyano group or a phenyl group; and n represents an integer of 25 to 150.

(3)

In Formula (3), $Z^{A1}$ represents an alkyl group having 1 to 4 carbon atoms.

By virtue of the fact that the dispersing agent for dispersing the fluororesin particles is a polymer having the structure represented by Formula (1) and the structure represented by Formula (2), the fluororesin particles can be dispersed satisfactorily in an acrylic resin, and conductive paths become readily formed on account of an exclusion effect elicited by the particles comprising a fluororesin and the dispersing agent.

The content ratio of the polymer having the structure represented by Formula (1) and the structure represented by Formula (2) in the dispersing agent for dispersing fluororesin particles in the acrylic resin is preferably 60 to 100 mass %, more preferably 80 to 100 mass %.

The dispersing agent for dispersing the fluororesin particles, and which is a polymer having the structure represented by Formula (1) and the structure represented by Formula (2), is not particularly limited so long as it can disperse fluororesin particles in an acrylic resin, and any known dispersing agent can be used. The dispersing agent is a polymer of at least one monomer selected from the group consisting of vinyl monomers and (meth)acrylic monomers having for instance vinyl groups and (meth)acrylic groups, i.e. is preferably a (meth)acrylic polymer. A commercially available dispersing agent that is a polymer having the structure represented by Formula (1) and the structure represented by Formula (2) may be used herein; examples thereof include Aron GF-400 (product name), by Toagosei Co., Ltd.

It suffices herein that that the content, in the surface layer, of the dispersing agent for dispersing the fluororesin particles and which is a polymer having the structure represented by Formula (1) and the structure represented by Formula (2) be such that fluororesin particles can be suitably dispersed and that conductive paths can be formed thanks to the above-described exclusion effect.

For instance the content of the dispersing agent which is a polymer having the structure represented by Formula (1) and the structure represented by Formula (2) is preferably 5 to 40 parts by mass, more preferably 15 to 35 parts by mass, relative to 100 parts by mass of the fluororesin particles. The content of the dispersing agent which is a polymer having the structure represented by Formula (1) and the structure represented by Formula (2) is preferably from 0.1 to 5 parts by mass, more preferably 0.5 to 2 parts by mass relative to 100 parts by mass of the acrylic resin.

The chemical structure of the dispersing agent that is a polymer having the structure represented by Formula (1) and the structure represented by Formula (2) can be identified by extracting and isolating the dispersing agent from the surface layer using a soluble solvent, and by performing then a comprehensive analysis including for instance an H-NMR analysis, C-NMR analysis, F-NMR analysis and/or MS spectrum analysis.

The content ratio of conductive tin oxide particles in the surface layer is 2.0 to 10.0 vol %. When the content ratio lies in the above range, surface resistivity can be lowered without detracting from the mechanical properties of the surface layer. A surface layer with low surface resistivity can be obtained, even if the compounding amount of conductive tin oxide particles as a conductive agent is comparatively small. The content ratio is preferably 3.0 to 8.0 vol %.

The content ratio of conductive tin oxide particles in the surface layer is preferably 10 to 60 parts by mass, more preferably 20 to 50 parts by mass, and yet more preferably 30 to 40 parts by mass, relative to 100 parts by mass of the binder resin. The content ratio of fluororesin particles in the surface layer is preferably 5.0 to 15.0 vol %, more preferably 6.0 to 12.0 vol %. The surface resistivity of the surface layer can be more effectively reduced when the content ratio lies in the above ranges.

Herein respective values of mass % of the acrylic resin, the fluororesin particles and the conductive tin oxide particles may be worked out by thermogravimetric analysis (TGA analysis) of the surface layer; the content ratio of the conductive tin oxide particles and the content ratio of the fluororesin particles in the surface layer can then be calculated on the basis of the respective densities of the foregoing.

The fluororesin particles are not particularly limited, and known fluororesin particles can be used herein. Examples include for instance polytetrafluoroethylene particles (PTFE particles) and perfluoroalkoxyalkane particles (PFA particles). The fluororesin particles preferably comprise PTFE particles; more preferably, the fluororesin particles are PTFE particles.

The particle diameter of the fluororesin particles is not particularly limited. For instance the number-average particle diameter of the fluororesin particles is preferably 1 to 10 µm, more preferably 1 to 5 µm.

Known particles can be used as the conductive tin oxide particles. Also the particle diameter of the conductive tin oxide particles is not particularly limited. For instance the number-average particle diameter of the primary particles of the conductive tin oxide particles is preferably 5 to 100 nm, more preferably 8 to 50 nm.

Commercially available particles such as SN-100P (product name) by Ishihara Sangyo Kaisha, Ltd. can be used as the conductive tin oxide particles. The conductive tin oxide particles may be surface-treated for instance with a known silane coupling agent.

The number-average dispersion diameter of the conductive tin oxide particles in the surface layer, is preferably 300 to 1000 nm, more preferably 400 to 500 nm.

The surface resistivity of the surface layer is preferably from $1.0 \times 10^8$ Ω/square to $1.0 \times 10^{12}$ Ω/square, more preferably from $1.0 \times 10^9$ Ω/square to $1.0 \times 10^{11}$ Ω/square.

The surface layer comprises a binder resin. The binder resin is not particularly limited, and any known binder resin can be used, in accordance with the purpose of the electrophotographic member. Preferably, the binder resin comprises an acrylic resin. Herein the term acrylic resin is a generic term of for instance acrylic resins and methacrylic resins.

The monomers that form the acrylic resin are not particularly limited. The acrylic resin is preferably at least one polymer selected from the group consisting of the following (meth)acrylic monomers.

(Meth)acrylic monomers include for instance pentaerythritol tri(meth)acrylate, pentaerythritol tetra(meth)acrylate, ditrimethylolpropane tetra(meth)acrylate, dipentaerythritol hexa(meth)acrylate, alkyl (meth)acrylates, benzyl (meth)acrylate, phenyl (meth)acrylate, ethylene glycol di(meth)acrylate and bisphenol A di(meth)acrylate.

The acrylic resin is preferably at least one polymer selected from the group consisting of pentaerythritol tri (meth)acrylate and pentaerythritol tetra(meth)acrylate. More preferably, the acrylic resin is a polymer of pentaerythritol triacrylate.

The content of the binder resin (acrylic resin) in the surface layer is preferably for instance 50.0 to 95.0 vol %, more preferably 75.0 to 90.0 vol %.

The surface layer can be formed for instance in accordance with the method below. Firstly a slurry is prepared that results from dispersing conductive tin oxide particles, which are the conductive agent, in an organic solvent. An acrylic monomer dispersion is produced next that comprises acrylic resin monomers, the particles comprising a fluororesin and a fluorine-based dispersing agent being a polymer having the structure represented by Formula (1) and the structure represented by Formula (2); the produced acrylic monomer dispersion is then mixed with the conductive agent slurry, to prepare a coating solution. As the case may require, multiple conductive agent slurries may be prepared and mixed with each other.

The acrylic monomer dispersion may contain other additives, such as known photopolymerization initiators, leveling agents and solvents, as needed.

The conductive agent slurry comprises conductive tin oxide particles, a solvent and, as needed, a dispersing agent for dispersing the conductive tin oxide particles.

As the solvent there can be used known solvents such as water; and organic solvents such as methyl ethyl ketone, methyl alcohol and isopropyl alcohol. The dispersing agent for dispersing the conductive tin oxide particles may be any agent that disperses the above particles; examples thereof include diisopropylamine, trioctylamine, malic acid, acetic acid and polymeric phosphoric acid.

The surface layer can be formed using the above coating solution. For instance known methods such as dip coating, spray coating, flow coating, shower coating, roll coating, spin coating and ring coating can be resorted to herein.

Once the base layer is coated with the coating solution, the surface layer can thereafter be formed as needed through drying and through polymerization of the acrylic resin monomers in accordance with a known method. As an illustrative means, for instance a photopolymerization initiator is added to the acrylic monomer dispersion, followed by curing using ultraviolet rays.

The surface of the surface layer may be imparted with an uneven shape. By imparting thus an uneven shape, the contact area with other contact members becomes smaller, and frictional resistance can be lowered. The means for imparting an uneven shape is not particularly limited, but for instance an electrophotographic member having a surface layer supported on a core or the like may be caused to rotate in the peripheral direction while being brought into contact with a lapping film containing abrasive grains, to polish as a result the surface of the surface layer and render thus the surface uneven. Alternatively, a method such as imprint processing may be resorted to in which a mold having been processed beforehand into a desired shape is brought into contact with the surface layer.

The thickness of the surface layer is preferably 0.05 to 10 µm, more preferably 0.1 to 5 µm, and yet more preferably 2 to 5 µm, from the viewpoint of cracking and bending resistance.

The use of the electrophotographic member is not particularly limited. For instance the electrophotographic member is suitably used for instance as an intermediate transfer member that temporarily transfers and holds a toner image, and/or as a transport transfer belt that nips and transports a recording material as a transfer material. In particular, the electrophotographic member can be suitably used as an intermediate transfer member. That is, the electrophotographic member is preferably an intermediate transfer member.

Image Forming Apparatus

An example of an image forming apparatus according to the present embodiment will be explained next. As illustrated in FIG. 3, the image forming apparatus has a so-called tandem configuration in which electrophotographic stations of respective colors are disposed juxtaposed to each other in the rotation direction of the intermediate transfer member.

The image forming apparatus comprises:
an image bearing member supporting a toner image thereon; and
an intermediate transfer member onto which the toner image formed on the image bearing member is primary-transferred, and which secondary-transfers, onto a recording material, the primary-transferred toner image.

The image forming apparatus comprises for instance the above electrophotographic member as the intermediate transfer member.

In the explanation the follows the suffixes Y, M, C and k are appended to the reference symbols of the configurations pertaining to yellow, magenta, cyan and black, respectively; however, these suffixes may in some instances be omitted for similar configurations.

In FIG. 3 charging devices 5Y, 5M, 5C, 5k, exposure devices 6Y, 6M, 6C, 6k, developing apparatuses 7Y, 7M, 7C, 7k and an intermediate transfer member 9 are disposed around respective photosensitive drums (photosensitive members, image bearing member) 4Y, 4M, 4C, 4k. Each photosensitive drum 4 is rotationally driven in the direction of arrow F, at a predetermined peripheral speed (process speed). The charging device 5 charges the peripheral surface of the photosensitive drum 4 to a predetermined polarity and predetermined potential (primary charging). A respective laser beam scanner as an exposure device 6 outputs laser light that is on/off modulated in accordance with image information inputted from an external device such as an image scanner or computer, not shown, to thereby perform scanning exposure of the charged surface on the photosensitive drum 4. As a result of this scanning exposure a respective electrostatic latent image conforming to the target image information becomes formed on the surface of the photosensitive drum 4.

The developing apparatuses 7Y, 7M, 7C, 7k each contain toners of respective color components for yellow (Y), magenta (M), cyan (C) and black (k). The developing apparatus 7 that is to be used is selected on the basis of the image information, and a developer (toner) is developed on the surface of the respective photosensitive drum 4, whereupon the electrostatic latent image is made visible in the form of a toner image. In the present embodiment a reversal development method is resorted to in which toner is caused to adhere to an exposed portion of the electrostatic latent image. Such a charging device, exposure device and developing apparatus make up an electrophotographic image forming means.

The intermediate transfer member 9 having an endless belt shape is disposed so as to be in contact with the surface of each photosensitive drum 4, while stretched between multiple tension rollers 15, 16, 17. The intermediate transfer member 9 turns in the direction of arrow G. In the present embodiment, the tension roller 15 is a tension roller that controls the tension of the intermediate transfer member 9 to a constant tension, the tension roller 17 is a driver roller of the intermediate transfer member 9, and the tension roller 16 is a facing roller for secondary transfer. Primary transfer rollers 8Y, 8M, 8C, 8k are disposed at primary transfer positions facing a respective photosensitive drum 4, across the intermediate transfer member 9 interposed in between.

Unfixed toner images of respective colors, formed on the photosensitive drums 4, are transferred onto the intermediate transfer member 9 as a result of application of a primary transfer bias, of a polarity opposite to the charging polarity of the toner, to the primary transfer rollers 8, using a constant voltage source or a constant current source; as a result, primary transfer is sequentially performed electrostatically on the intermediate transfer member 9. A full-color image in which unfixed toner images of four colors are superimposed on each other is obtained on the intermediate transfer belt 9. The intermediate transfer member 9 rotates while supporting thereon the toner image having been thus transferred from the photosensitive drums 4. Upon each rotation of the photosensitive drums 4 after primary transfer, untransferred toner on the surface of the photosensitive drums 4 is cleaned off by respective cleaning devices 13, and the image forming process is repeated.

At a secondary transfer position of the intermediate transfer member 9 facing the transport path of a recording material 10, a secondary transfer roller (transfer portion) 12 is disposed while in pressure-contact against the toner image bearing surface of the intermediate transfer belt 9. On the back surface side of the intermediate transfer belt 9 at the secondary transfer position there is disposed a facing roller 16, as a counter electrode of the secondary transfer roller 12, and that has bias applied thereto. To transfer the toner image onto the intermediate transfer member 9 to the recording material 10, a bias of polarity identical to that of the toners is applied to the facing roller 16 by a transfer bias applying means 18; herein for instance −1000 to −3000 V is applied, such that there flows current of −10 to −50 µA. This transfer voltage is detected by a transfer voltage detection means 19. A cleaning device (belt cleaner) 14 is further provided, downstream of the secondary transfer position, that removes residual toner remaining on the intermediate transfer member 9 after secondary transfer.

The recording material 10 is transported in the direction of arrow H through a transport guide 11, and is introduced at the secondary transfer position. The recording material 10 introduced at the secondary transfer position is nipped and transported at the secondary transfer position, whereupon constant voltage bias (transfer bias) controlled to a predetermined value is applied, by the secondary transfer bias applying means 18, to the facing roller 16 of the secondary transfer roller 9. Through application of transfer bias of polarity identical to that of the toner, to the facing roller 16, the four-color full-color image (toner image) superimposed on the intermediate transfer member 9 at the transfer site is transferred to the recording material 10, all at once, and a full-color unfixed toner image becomes thus formed on the recording material. The recording material 10 having had the toner image transferred thereto is introduced into a fixing unit, not shown, where the toner image is fixed through heating.

EXAMPLES

The present disclosure will be explained in more detail hereafter on the basis of examples. The aspects of the present disclosure are not limited to the examples below. In Examples 1 to 6 and Comparative examples 1 to 3 below, the surface layer was formed within 10 minutes from the preparation of a coating material for surface layer formation.

Example 1

Preparation of Conductive Agent Slurry 1

The materials below were weighed at mass ratios of ATO/DIA/malic acid/IPA=12/0.024/0.048/48, and were stirred at 300 rpm for 2 hours using a planetary ball mill (model: P-6 by Fritsch Japan Co., Ltd.) having added thereto a suitable amount of zirconia beads of diameter Φ0.5 mm, to yield Conductive agent slurry 1.

Material of Conductive Agent Slurry 1
  ATO: antimony-doped tin oxide particles (conductive agent particles) (product name: SN-100P, by Ishihara Sangyo Kaisha, Ltd.)
  DIA: diisopropylamine (by Kishida Chemical Co., Ltd.)
  Malic acid: DL-malic acid (by Kishida Chemical Co., Ltd.)
  IPA: isopropyl alcohol (by Kishida Chemical Co., Ltd.)
  The volume resistivity of a powder compact of antimony-doped tin oxide particles was 1.4 Ω·cm.

Preparation of Conductive Agent Slurry 2

The materials below were weighed at mass ratios of dry surface-treated ATO/DIA/TOA/PP/MEK/MeOH/water=12.5/0.031/0.094/0.5/17.8/0.313/0.063, and were stirred at 300 rpm for 2 hours using a planetary ball mill (model: P-6 by Fritsch Japan Co., Ltd.) having added thereto a suitable amount of zirconia beads of diameter Φ0.5 mm, to yield Conductive agent slurry 2.

Materials of Conductive Agent Slurry 2
  Dry surface-treated ATO: antimony-doped tin oxide particles (conductive agent particles) (product name: SN-100P, by Ishihara Sangyo Kaisha, Ltd.) resulting from performing a 30% dry surface treatment, relative to the surface area of ATO, using a silane coupling agent (product name: DOWSIL SZ 6070 Silane, by Dow Chemical Japan Ltd)
  DIA: diisopropylamine (by Kishida Chemical Co., Ltd.)
  TOA: trioctylamine (by Kanto Chemical Co., Inc.)
  PP: polymer phosphoric acid (product name: DISPERBYK-111, by BYK Japan KK)
  MEK: methyl ethyl ketone (by Kishida Chemical Co., Ltd.)
  MeOH: methyl alcohol (by Kishida Chemical Co., Ltd.)
  Water: pure water Preparation of Acrylic Monomer Dispersion 1 of Fluororesin Particles The materials below were weighed at mass ratios of AN/PTFE/GF/OR/S/MIBK=254/41/10/19/0.6/340, and were roughly dispersed in a homogenizer, to yield a solution that was then dispersed using a high-pressure emulsifying disperser (product name: Nanovater, by Yoshida Kikai Co., Ltd.).

Surface Layer Material
  AN: Pentaerythritol triacrylate (product name: Aronix M-305, by Toagosei Co., Ltd.)
  PTFE: PTFE particles (product name: Lubron L-2, by Daikin Industries, Ltd.)
  GF: dispersing agent (product name: Aron GF-400, by Toagosei Co., Ltd.) for fluororesin particles, being a polymer having the structure represented by Formula (1) and the structure represented by Formula (2)
  OR: photopolymerization initiator (product name: Omnirad 907 by Resins B.V.)
  S: leveling agent (product name: Cymac US-270, by Toagosei Co., Ltd.)
  MIBK: methyl isobutyl ketone (by Kishida Chemical Co., Ltd.)

Preparation of Coating Material 1 for Surface Layer Formation

Coating material 1 for surface layer formation was obtained by weighing and stirring Conductive agent slurry 1/Conductive agent slurry 2/methyl ethyl ketone/Acrylic monomer dispersion 1 of fluororesin particles at a mass ratio of 66.2/20.7/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). The content ratio of ATO, which are conductive agent particles, was 4.1 vol %, and the content ratio of PTFE particles was 8.0 vol %. The compounding amount of the GF solids, as a fluorine-based dispersing agent, was 1 part by mass relative to 100 parts by mass of the acrylic resin.

Formation of a Base Layer

The following starting materials were used to form a base layer.
  Polyethylene naphthalate (product name: Teonex TN8050SC, by Teijin Limited) as a polyester resin (hereafter referred to as "PE (1)").
  Polyether ester amide (product name: TPAE-10HP-10, by T & K TOKA Co., Ltd.) (hereafter referred to as "PEEA") as a conductive agent.
  Potassium perfluorobutane sulfonate (product name: FTOP KFBS, by Mitsubishi Materials Electronic Chemicals Co., Ltd.) (hereafter referred to as "KFBS").

The melting point of PE (1) was 262° C.

The above PE (1)/PEEA/KFBS were mixed at a ratio of 80/18/2 (mass %) and were melt-kneaded at 290° C. for 5 minutes using a twin-screw extruder (product name: TEX30α, by Japan Steel Works, Ltd.) to yield a resin mixture made up of PE (1), PEEA and KFBS. The obtained resin mixture was pelletized using a cutter (product name: Fan Cutter, by Hoshi Plastics Co., Ltd.) to yield resin mixture pellets (pellet size: major axis 3 mm×minor axis 2 mm). The obtained pellets were dried at 140° C. for 6 hours.

The dried pellets of the resin mixture were then charged into the hopper of an injection molding apparatus (product name: SE180D, by Sumitomo Heavy Industries, Ltd.). The cylinder temperature was set to 290° C., the mixture was melted under screw stirring, and the resulting mixture was injection-molded into a mold, to produce a test tube-shaped preform. The obtained preform was set in a blow molding machine, and was blow-molded within a blow mold kept at a mold temperature of 110° C., by the forces of a stretching rod and air, at a preform temperature of 155° C., air pressure of 0.3 MPa, and a stretching rod speed of 1000 mm/s, to yield a blow bottle. Both ends of this blow bottle were cut, to thereby cut out a base layer having an endless belt shape 712 mm long in the peripheral direction and 244 mm long (i.e. wide) in a direction perpendicular to the peripheral direction. The thickness of the base layer was 70 μm.

Formation of a Surface Layer

The base layer obtained through blow molding was set at the outer periphery of a cylindrical mold, the ends were sealed, and then the mold was immersed in a container filled with the produced surface layer coating solution, and the mold was then pulled up such that the relative speed of liquid surface of the curable composition and the base layer was constant, to produce as a result a coating film of Coating material 1 for surface layer formation, on the base layer surface. The pull-up rate (relative speed between the liquid surface of the curable composition and the base layer) and the solvent ratio of the curable composition can be adjusted in accordance with the required film thickness.

In the present example, the pull-up rate was adjusted to 10 to 50 mm/second, and the thickness of the surface layer was adjusted to 3 μm. After being formed, the coating film was dried for 1 minute at 23° C. under exhaust. The drying temperature and drying time were adjusted as appropriate on the basis of solvent type, solvent ratio and film thickness. The coating film was thereafter irradiated with ultraviolet rays using a UV irradiation machine (product name: UE06/81-3, by Eye Graphics Co., Ltd.) until the cumulative light amount reached 600 mJ/cm$^2$, to thereby cure the coating film and form a surface layer. An endless electrophotographic belt according to Example 1 was obtained in this manner.

Evaluation 1. L Function of a Surface Layer Conductive Agent

Evaluation of the Dispersion State of Conductive Agent on the Basis of an L Function An evaluation sample was produced from the electrophotographic belt. Samples 5 mm long, 5 mm wide, and as thick as the total thickness of the electrophotographic belt, were sampled from the electrophotographic belt at 12 sites thereof. The sampling sites were 3 sites in the width direction of the electrophotographic belt and 4 sites, at 90° intervals from each other, in the peripheral direction. One of the 3 sites in the width direction was set so that the center thereof in the width direction matched the center of each evaluation sample in the width direction. The other 2 sites were positioned so that an inner side thereof (midpoint side) lying 2 mm from both ends in the width direction matched one end of the sample in the width direction.

An arbitrary position of each of the 12 evaluation samples, on the surface corresponding to the outer surface of the surface layer (i.e. one surface on the reverse side from that facing the base layer) was observed using a scanning electron microscope (SEM) (product name: FE-SEM JSM-F100, by JEOL Ltd.), to yield a respective SEM image having a size 42.7 μm long×32.0 μm wide. The observation conditions included a backscattered electron image mode at 3000 magnifications, and the backscattered electron image acquisition conditions included an acceleration voltage set to 5.0 kV and a working distance set to 6 mm. In the obtained SEM images the portions of conductive tin oxide particles (groups) were observed as bright portions.

The obtained SEM images were then subjected to black-and-white binarization using image processing software (product name: MATLAB; by MathWorks Inc.) so that conductive agent portions were rendered white and binder resin portions were rendered black. Through binarization such that from the high-brightness side the vol % fraction i.e. the area % fraction of the conductive agent is rendered white and the rest black, it was possible to obtain an image in which there were extracted, in the form of white portions, only the conductive agent.

The concrete conditions for binarization included loading first a SEM image into the image processing software, and converting then the SEM image into a 256-gradation luminance image. Binarization for separating only the conductive agent portion into white and the binder resin portion into black was performed next. In this case a threshold value was established so that the occupancy area ratio of white portions (ratio of the number of pixels taken up by white portions relative to the total number of pixels in one SEM image) of white portions after binarization matched the content ratio of the conductive tin oxide particles.

Plane barycentric coordinates values (X coordinate, Y coordinate) as well as a number-average particle diameter of the conductive tin oxide particles (groups) were determined from the obtained binarized image. Specifically, plane barycentric coordinates of respective particles were worked out relying on a regionprops function that involves performing a shape measurement of an image region, for the portions (white portions) of the conductive tin oxide particles within the binarized image, using the above image processing software.

To work out the number-average particle diameter, the circle-equivalent diameter of the particles was calculated first. The circle-equivalent diameter of the particles denotes the diameter of a circle having the same surface area as the surface area of that particle. Specifically, the number of pixels that made up the each particle (group) was calculated, and the actual surface area of the particle was calculated by multiplying this number of pixels by the surface area of one pixel. The number of pixels made up of by respective particles in each SEM image was multiplied by 0.15×0.15 μm², since the length of one side of one pixel corresponds to 0.15 μm.

The circle-equivalent diameter is calculated by working out the diameter of a circle having that surface area. A number-average dispersion diameter was then calculated by dividing the sum total of the circle-equivalent diameters of the particles obtained above, by the total number of particles.

Next, Ripley's K function was calculated first, in accordance with the expression below, on the basis of the plane barycentric coordinate values (X coordinate, Y coordinate) of the conductive tin oxide particles.

$$K(d) = \frac{1}{\lambda}\left(\frac{1}{n}\sum_{i \ne j}\frac{1}{w_i}I_d(i, j)\right)$$

In the expression, i is an index denoting each particle in the image, A is the average density of particles in the image, and n is the number of particles in the image. Further, $w_i$ is a ratio (surface area B/surface area A) of "the surface area A of a circle i of radius d centered on the barycentric coordinates of the particle i" and "the surface area B of the portion, included in the image, of a circle i of radius d centered on the barycentric coordinates of the particle i". Herein $w_i$ is used for correcting underestimation arising from the absence of particles outside the image when the particle i is present near the image boundary. Further, $I_d(i,j)$ is a function that takes on a value of 1 when the barycentric coordinates of a particle j lie within a circle of radius d centered on the barycentric coordinates of the particle i, and takes on a value 0 otherwise. In the present disclosure the radius d is a discrete function that takes on a value for each pixel (0.033 μm) of the image.

A value L(d) of the L function for an interparticle distance d (radius d) in the range of 300 nm to 1 μm was worked out in accordance with the expression below, on the basis of Ripley's K function.

$$L(d) = \sqrt{\frac{K(d)}{\pi}} - d$$

A value of the L function being always positive in the range from the interparticle distance of 300 nm to 1 μm signifies that the above value of L(d) is always positive in the range of 300 nm to 1 μm of the interparticle distance d.

Herein all the L functions denoting the distribution state of conductive tin oxide particles (groups) obtained by analyzing SEM images created from the 12 evaluation samples in accordance with the method described above exhibited positive values of the L function in the range of interparticle distance of 300 nm to 1 μm. The results are given in Table 1. In Table 1 that sets out the below-described evaluation results, the notation "Positive" pertaining to the item "Sign of L function (interparticle distance of 300 nm to 1 μm)" denoting the result of Evaluation 1, indicates that all instances of L function worked out on the basis of the above analysis of the 12 evaluation samples were positive, in the range of interparticle distance of 300 nm to 1 µm. By contrast, the notation "Negative" pertaining to the above item signifies that at least one L function worked out in the above analysis of the 12 evaluation samples was negative, in the range of interparticle distance of 300 nm to 1 µm.

Figure 4:
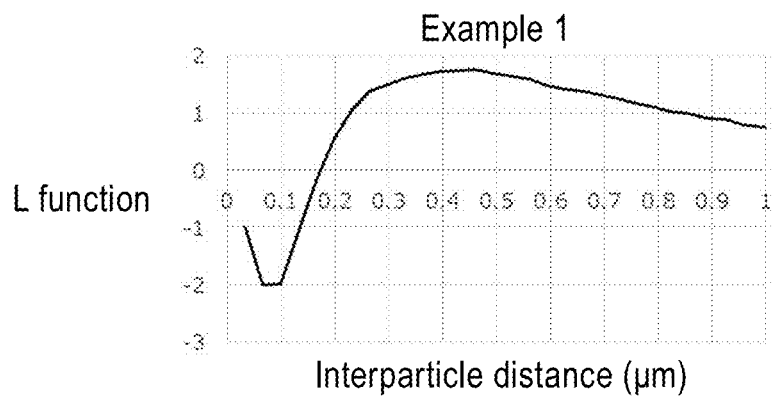
FIG. 4 is an L function of Example 1.

FIG. 4 illustrates a graph of the L function obtained as a result of analyzing a SEM image created from one of the 12 evaluation samples. In Example 1, the number-average dispersion diameter of ATO was 460 nm.

Evaluation 2. Surface Resistivity of a Surface Layer

The surface resistivity of the surface layer was measured in accordance with Japanese Industrial Standards (JIS) K 6911 using a resistivity meter (product name: Hiresta UP MCP-HT450 model, by Nittoseiko Analytech). To measure the surface resistivity of the surface layer, a UR100 probe was brought into contact with the surface layer in an environment at a temperature of 23° C. and at a relative humidity of 50%; the applied voltage was set to 100 V, the measurement time was set to 10 seconds, and measurements were performed at four respective points for each 90° phase, in the peripheral direction of the surface layer; the average value of these measured values was then calculated. The results are given in Table 1.

Evaluation 3. Environmental Variation in Surface Resistivity of the Surface Layer Environmental variation in the surface resistivity of the surface layer was calculated by subtracting the value of the common logarithm of the surface resistivity of the surface layer, as measured in an environment at a temperature of 30° C. and a humidity of 80%, from the value of the common logarithm of the surface resistivity as measured in an environment at a temperature of 15° C. and humidity of 10%. The results are given in Table 1.

Example 2

Preparation of Coating Material 2 for Surface Layer Formation

Coating material 2 for surface layer formation was obtained in the same way as in Example 1, but herein by weighing and stirring Conductive agent slurry 1/Conductive agent slurry 2/methyl ethyl ketone/and Acrylic monomer dispersion 1 of fluororesin particles at a mass ratio of 88.3/20.7/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). Herein ATO was 4.9 vol % and PTFE was 7.9 vol %. The compounding amount of GF solids relative to 100 parts by mass of acrylic resin was 1 part by mass.

Formation of a Surface Layer

Figure 5:
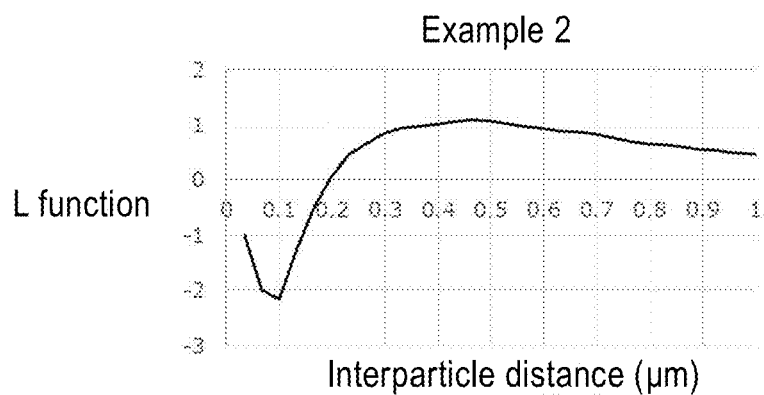
FIG. 5 is an L function of Example 2.

A surface layer was formed in the same way as in Example 1 but using herein the above Coating material 2 for surface layer formation. An electrophotographic belt according to Example 2 was thus obtained. The obtained electrophotographic belt was subjected to Evaluations 1 to 3 described in Example 1. The results of Evaluation 1 are illustrated in FIG. 5 and Table 1. The number-average dispersion diameter of ATO was 460 nm. The results of Evaluations 2 and 3 are given in Table 1.

Example 3

Preparation of Conductive Agent Slurry 3

The materials below were weighed at mass ratios of ATO/TOA/acetic acid/IPA=12.0/0.029/0.12/47.9 and were stirred at 300 rpm for 2 hours using a planetary ball mill (model: P-6 by Fritsch Japan Co., Ltd.) having added thereto a suitable amount of zirconia beads of diameter Φ0.5 mm, to yield Conductive agent slurry 3.

Materials of Conductive Agent Slurry 3

ATO: Particles comprising antimony-doped tin oxide (product name: SN-100P, by Ishihara Sangyo Kaisha, Ltd.)

TOA: trioctylamine (by Kanto Chemical Co., Inc.)

Acetic acid: Acetic acid (by Kishida Chemical Co., Ltd.)

IPA: isopropyl alcohol (by Kishida Chemical Co., Ltd.)

Preparation of Coating Material 3 for Surface Layer Formation

Coating material 3 for surface layer formation was obtained in the same way as in Example 1, but herein by weighing and stirring Conductive agent slurry 3/Conductive agent slurry 2/methyl ethyl ketone/Acrylic monomer dispersion 1 of fluororesin particles at a mass ratio of 132.4/20.7/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). Herein ATO was 6.4 vol % and PTFE was 7.8 vol %. The compounding amount of GF solids relative to 100 parts by mass of acrylic resin was 1 part by mass.

Formation of a Surface Layer

Figure 6:
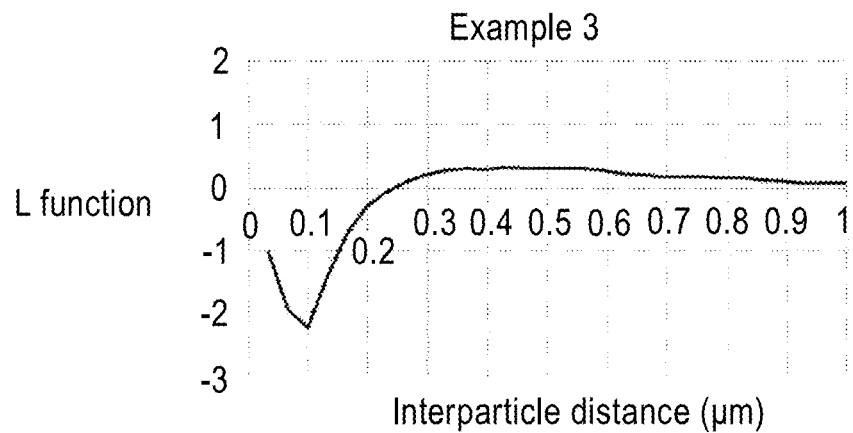
FIG. 6 is an L function of Example 3.

A surface layer was formed in the same way as in Example 1 but using herein the above Coating material 3 for surface layer formation. An electrophotographic belt according to Example 3 was thus obtained. The obtained electrophotographic belt was subjected to Evaluations 1 to 3. The results of Evaluation 1 are illustrated in FIG. 6 and Table 1. The number-average dispersion diameter of ATO was 430 nm. The results of Evaluations 2 and 3 are given in Table 1.

Example 4

Preparation of Coating Material 4 for Surface Layer Formation

Coating material 4 for surface layer formation was obtained in the same way as in Example 1, but herein by weighing and stirring Conductive agent slurry 1/methyl ethyl ketone/Acrylic monomer dispersion 1 of fluororesin particles at a mass ratio of 66.2/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). Herein ATO was 2.5 vol % and PTFE was 8.1 vol %. The compounding amount of GF solids relative to 100 parts by mass of acrylic resin was 1 part by mass.

Formation of a Surface Layer

Figure 7:
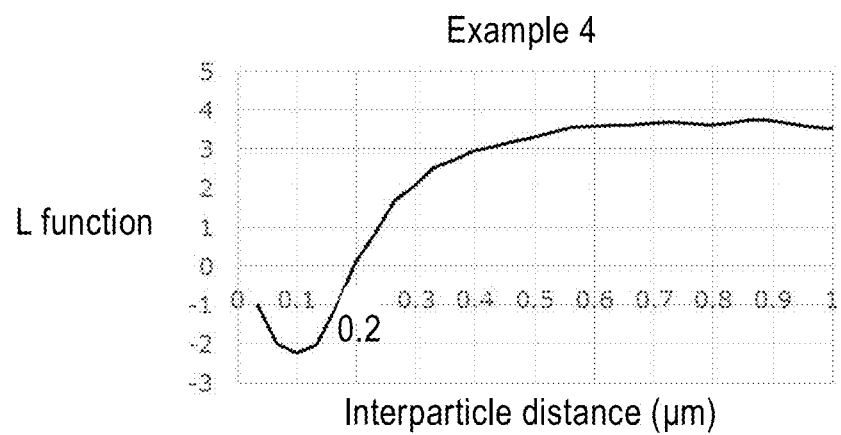
FIG. 7 is an L function of Example 4.

A surface layer was formed in the same way as in Example 1 but using herein the above Coating material 4 for surface layer formation. An electrophotographic belt according to Example 4 was thus obtained. The obtained electrophotographic belt was subjected to Evaluations 1 to 3 described in Example 1. The results of Evaluation 1 are illustrated in FIG. 7 and Table 1. The number-average dispersion diameter of ATO was 490 nm. The results of Evaluations 2 and 3 are given in Table 1.

Example 5

Preparation of Conductive Agent Slurry 4

The materials below were weighed at mass ratios of dry surface-treated ATO/DIA/TOA/PP/MEK/MeOH/water=12.5/0.031/0.094/0.5/17.8/0.313/0.063, and were stirred at 300 rpm for 2 hours using a planetary ball mill (model: P-6 by Fritsch Japan Co., Ltd.) having added thereto a suitable amount of zirconia beads of diameter Φ0.5 mm, to yield Conductive agent slurry 4.

Materials of Conductive Agent Slurry 4

Dry surface-treated ATO: antimony-doped tin oxide particles (conductive agent particles) (product name: SN-100P, by Ishihara Sangyo Kaisha, Ltd.) resulting from performing a 10% dry surface treatment, relative to the surface area of ATO, using a silane coupling agent (product name: KBM-3033, by Shin-Etsu Chemical Co., Ltd.)
  DIA: diisopropylamine (by Kishida Chemical Co., Ltd.)
  TOA: trioctylamine (by Kanto Chemical Co., Inc.)
  PP: polymer phosphoric acid (product name: DISPERBYK-111, by BYK Japan KK)
  MEK: methyl ethyl ketone (by Kishida Chemical Co., Ltd.)
  MeOH: methyl alcohol (by Kishida Chemical Co., Ltd.)
  Water: pure water The volume resistivity of the powder compact of antimony-doped tin oxide particles subjected to a 10% dry surface treatment was 2 Ω·cm.

Preparation of Coating Material 5 for Surface Layer Formation

Coating material 5 for surface layer formation was obtained in the same way as in Example 1, but herein by weighing and stirring Conductive agent slurry 3/Conductive agent slurry 4/methyl ethyl ketone/Acrylic monomer dispersion 1 of fluororesin particles at a mass ratio of 132.4/20.7/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). Herein ATO was 6.4 vol % and PTFE was 7.8 vol %. The compounding amount of GF solids relative to 100 parts by mass of acrylic resin was 1 part by mass.

Formation of a Surface Layer

Figure 8:
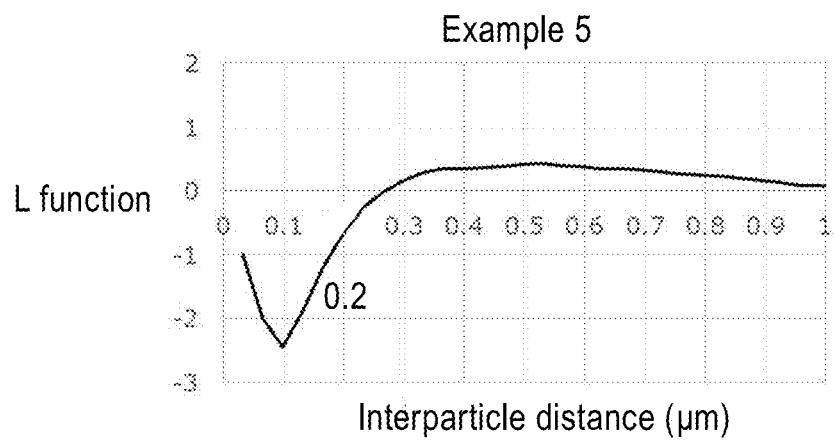
FIG. 8 is an L function of Example 5.

A surface layer was formed in the same way as in Example 1 but using herein the above Coating material 5 for surface layer formation. An electrophotographic belt according to Example 5 was thus obtained. The obtained electrophotographic belt was subjected to Evaluations 1 to 3. The results of Evaluation 1 are illustrated in FIG. 8 and Table 1. The number-average dispersion diameter of ATO was 440 nm. The results of Evaluations 2 and 3 are given in Table 1.

Example 6

Preparation of Conductive Agent Slurry 5

The materials below were weighed at mass ratios of dry surface-treated ATO/DIA/TOA/PP/MEK/MeOH/water=12.5/0.031/0.094/0.5/17.8/0.313/0.063, and were stirred at 300 rpm for 2 hours using a planetary ball mill (model: P-6 by Fritsch Japan Co., Ltd.) having added thereto a suitable amount of zirconia beads of diameter Φ0.5 mm, to yield Conductive agent slurry 5.

Materials of Conductive Agent Slurry 5

Dry surface-treated ATO: antimony-doped tin oxide particles (conductive agent particles) (product name: SN-100P, by Ishihara Sangyo Kaisha, Ltd.) resulting from performing a 30% dry surface treatment, relative to the surface area of ATO, using a silane coupling agent (product name: KBM-3033, by Shin-Etsu Chemical Co., Ltd.).
  DIA: diisopropylamine (by Kishida Chemical Co., Ltd.)
  TOA: trioctylamine (by Kanto Chemical Co., Inc.)
  PP: polymer phosphoric acid (product name: DISPERBYK-111, by BYK Japan KK)
  MEK: methyl ethyl ketone (by Kishida Chemical Co., Ltd.)
  MeOH: methyl alcohol (by Kishida Chemical Co., Ltd.)
  Water: pure water The volume resistivity of the powder compact of antimony-doped tin oxide particles subjected to a 30% dry surface treatment was 2.7 Ω·cm.

Preparation of Coating Material 6 for Surface Layer Formation

Coating material 6 for surface layer formation was obtained in the same way as in Example 1, but herein by weighing and stirring Conductive agent slurry 3/Conductive agent slurry 5/methyl ethyl ketone/Acrylic monomer dispersion 1 of fluororesin particles at a mass ratio of 132.4/20.7/63/239.3.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm$^3$). Herein ATO was 6.4 vol % and PTFE was 7.8 vol %. The compounding amount of GF solids relative to 100 parts by mass of acrylic resin was 1 part by mass.

Formation of a Surface Layer

Figure 9:
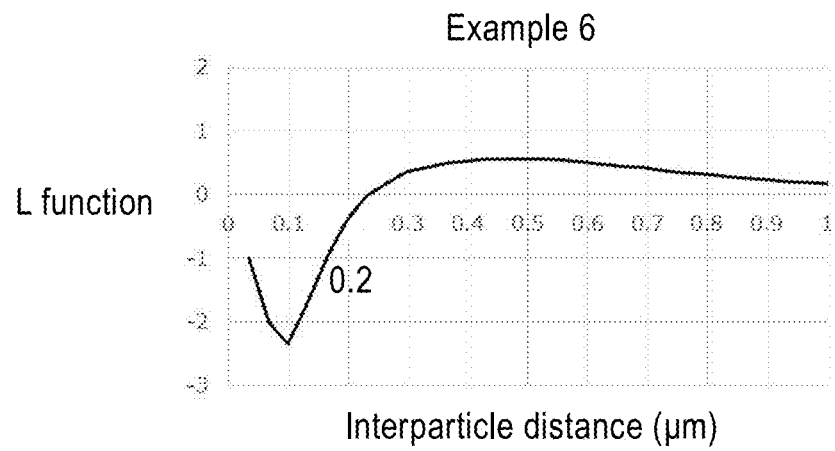
FIG. 9 is an L function of Example 6.

A surface layer was formed in the same way as in Example 1 but using herein the above Coating material 6 for surface layer formation. An electrophotographic belt according to Example 6 was thus obtained. The obtained electrophotographic belt was subjected to Evaluations 1 to 3. The results of Evaluation 1 are illustrated in FIG. 9 and Table 1. The number-average dispersion diameter of ATO was 420 nm. The results of Evaluations 2 and 3 are given in Table 1.

Comparative Example 1

Preparation of Acrylic Monomer Solution C1

The materials below were weighed at mass ratios of AN/OR/S/MIBK=254/19/0.6/340, and were roughly dispersed in a homogenizer, to yield a solution that was then dispersed using a high-pressure emulsifying disperser (product name: Nanovater, by Yoshida Kikai Co., Ltd.).

Surface Layer Material
  AN: Pentaerythritol triacrylate (product name: Aronix M-305, by Toagosei Co., Ltd.)
  OR: photopolymerization initiator (product name: Omnirad 907 by Resins B.V.)
  S: leveling agent (product name: Cymac US-270, by Toagosei Co., Ltd.)
  MIBK: methyl isobutyl ketone (by Kishida Chemical Co., Ltd.)

Preparation of Coating Material C1 for Surface Layer Formation

Coating material C1 for surface layer formation was obtained in the same way as in Example 1, but herein by weighing and stirring Conductive agent slurry 1/Conductive agent slurry 2/methyl ethyl ketone/Acrylic monomer solution C1 at a mass ratio of 66.2/20.7/63/220.9.

The content ratio of ATO and PTFE in the surface layer can be calculated on the basis of the mass ratio of the solids of ATO, PTFE and AN, and the respective densities of the foregoing (ATO: 6.33 g/cm$^3$, PTFE: 2.15 g/cm$^3$, AN: 1.2 g/cm³). Herein ATO was 4.4 vol % and PTFE was 0 vol %. The compounding amount of GF solids relative to 100 parts by mass of acrylic resin was 0 parts by mass.

Formation of a Surface Layer

Figure 10:
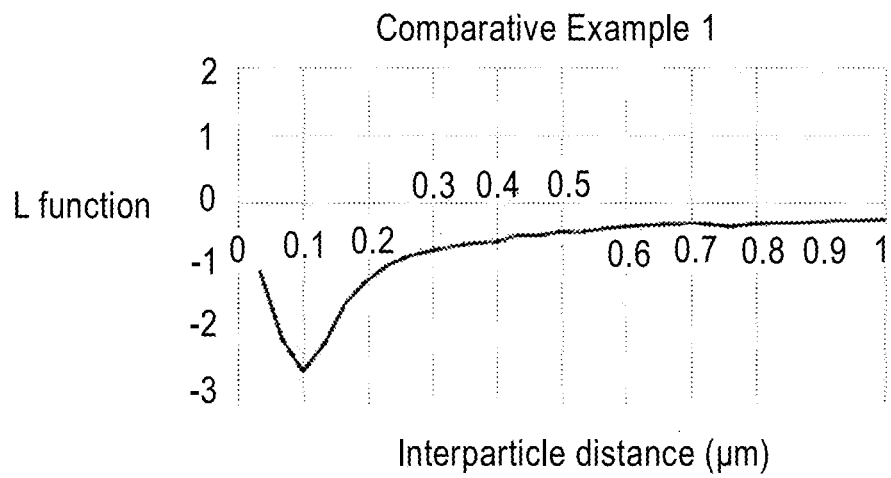
FIG. 10 is an L function of Comparative example 1.

A surface layer was formed in the same way as in Example 1 but using herein the above Coating material C1 for surface layer formation. An electrophotographic belt according to Comparative example 1 was thus obtained. The obtained electrophotographic belt was subjected to Evaluations 1 to 3. The results of Evaluation 1 are illustrated in FIG. 10 and Table 1. The number-average dispersion diameter of ATO was 450 nm. Table 1 sets out the results of Evaluations 2 and 3

Comparative Example 2

Preparation of Coating Material C2 for Surface Layer Formation

Coating material C2 for surface layer formation was obtained in the same way as in Example 2, but herein by weighing and stirring Conductive agent slurry 1/Conductive agent slurry 2/methyl ethyl ketone/Acrylic monomer solution C1 at a mass ratio of 88.3/20.7/63/220.9

The content ratio of ATO and PTFE in the surface layer can be calculated on the basis of the mass ratio of the solids of ATO, PTFE and AN, and the respective densities of the foregoing (ATO: 6.33 g/cm³, PTFE: 2.15 g/cm³, AN: 1.2 g/cm³). Herein ATO was 5.3 vol % and PTFE was 0 vol %. The compounding amount of GF solids relative to 100 parts by mass of acrylic resin was 0 parts by mass.

Formation of a Surface Layer

Figure 11:
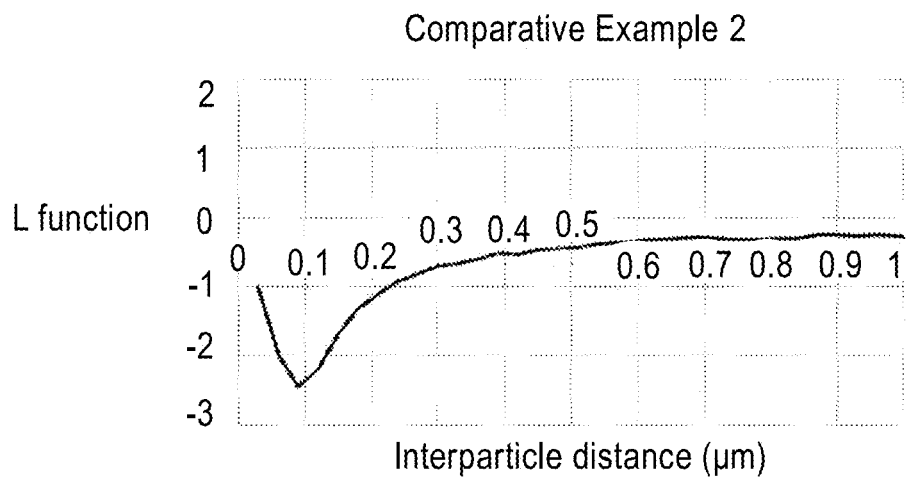
FIG. 11 is an L function of Comparative example 2.

A surface layer was formed in the same way as in Example 1 but using herein the above Coating material C2 for surface layer formation. An electrophotographic belt according to Comparative example 2 was thus obtained. The obtained electrophotographic belt was subjected to Evaluations 1 to 3. The results of Evaluation 1 are illustrated in FIG. 11 and Table 1. The number-average dispersion diameter of ATO was 460 nm. Table 1 sets out the results of Evaluations 2 and 3.

Comparative Example 3

Preparation of Coating Material C3 for Surface Layer Formation

Coating material C3 for surface layer formation was obtained in the same way as in Example 3, but herein by weighing and stirring Conductive agent slurry 3/Conductive agent slurry 2/methyl ethyl ketone/Acrylic monomer solution C1 at a mass ratio of 132.4/20.7/63/220.9.

The content ratio of ATO and PTFE in the surface layer can be calculated on the basis of the mass ratio of the solids of ATO, PTFE and AN, and the respective densities of the foregoing (ATO: 6.33 g/cm³, PTFE: 2.15 g/cm³, AN: 1.2 g/cm³). Herein ATO was 6.9 vol % and PTFE was 0 vol %. The compounding amount of GF solids relative to 100 parts by mass of acrylic resin was 0 parts by mass.

Formation of a Surface Layer

Figure 12:
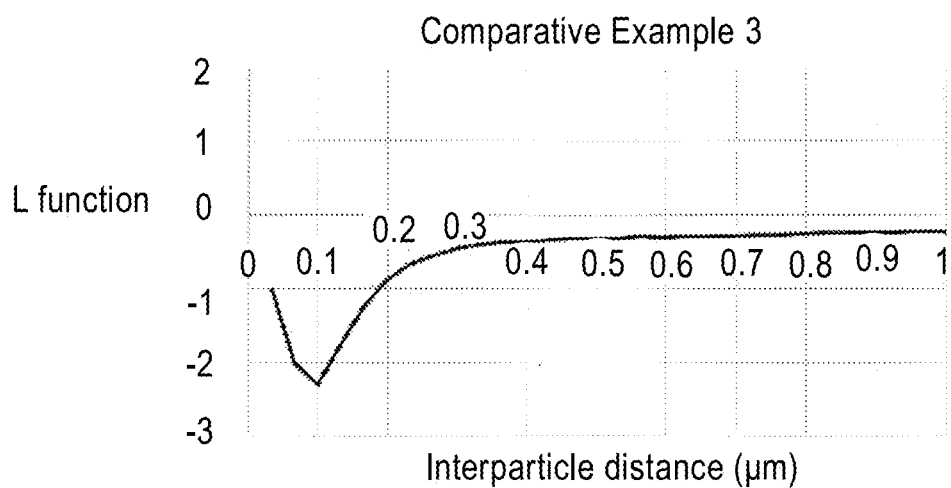
FIG. 12 is an L function of Comparative example 3.

A surface layer was formed in the same way as in Example 1 but using herein the above Coating material C3 for surface layer formation. An electrophotographic belt according to Comparative example 3 was thus obtained. The obtained electrophotographic belt was subjected to Evaluations 1 to 3. The results of Evaluation 1 are illustrated in FIG. 12 and Table 1. The number-average dispersion diameter of ATO was 440 nm.

Table 1 sets out the results of Evaluations 2 and 3.

Comparative Example 4

Preparation of Coating Material C4 for Surface Layer Formation

Coating material C2 for surface layer formation was allowed to stand for 3 months, to yield Coating material C4 for surface layer formation.

Formation of a Surface Layer

A surface layer was formed in the same way as in Example 1 but using herein the above Coating material C4 for surface layer formation. An electrophotographic belt according to Comparative example 4 was thus obtained. The obtained electrophotographic belt was subjected to Evaluations 1 to 3. The results of Evaluations 1 to 3 are given in Table 1. The number-average dispersion diameter of the antimony-doped tin oxide particles was 1150 nm. Table 1 sets out the results of Evaluations 2 and 3.

Reference Example

Preparation of Coating Material S1 for Surface Layer Formation

Coating material S1 for surface layer formation was obtained in the same way as in Example 1, but herein by weighing and stirring Conductive agent slurry 4 of zinc antimonate/Conductive agent slurry 5 of zinc antimonate/methyl ethyl ketone/Acrylic monomer solution C1 at a mass ratio of 35.7/20.7/63/220.9

Zinc Antimonate Conductive Agent Slurry

Conductive agent slurry 4: (product name: Celnax CX-Z210IP, by Nissan Chemical Industries, Ltd.)

Conductive agent slurry 5: (product name: Celnax CX-Z410K, by Nissan Chemical Industries, Ltd.)

The content ratio of zinc antimonate and PTFE in the surface layer can be calculated on the basis of the mass ratio of the solids of zinc antimonate, PTFE and AN, and the respective densities of the foregoing (zinc antimonate: 6.07 g/cm³, PTFE: 2.15 g/cm³, AN: 1.2 g/cm³). Zinc antimonate was 3.3 vol %, and PTFE was 0 vol %. The compounding amount of GF solids relative to 100 parts by mass of AN was 0 parts by mass.

Formation of a Surface Layer

Figure 13:
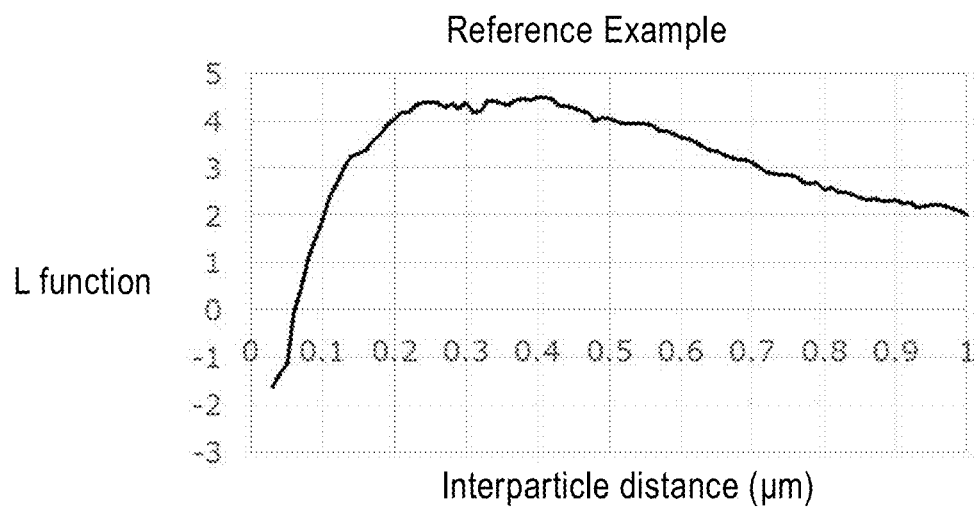
FIG. 13 is an L function of a reference example.

A surface layer was formed in the same way as in Example 1 but using herein the above Coating material S1 for surface layer formation. An electrophotographic belt according to the reference example was thus obtained. The obtained electrophotographic belt was subjected to Evaluations 1 to 3. The results of Evaluation 1 are illustrated in FIG. 13 and Table 1. The number-average dispersion diameter of zinc antimonate was 350 nm. The results of Evaluations 2 and 3 are given in Table 1.

TABLE 1

| | Formulation | | | | | Surface layer Sign of L function (interparticle distance 300 nm to 1 μm) | Evaluation results | |
|---|---|---|---|---|---|---|---|---|
| | Amount of conductive agent particles (parts by mass relative to 100 parts by mass of acrylic resin) | Dispersing agent of conductive agent | Content ratio (vol %) of conductive agent particles | Content ratio (vol %) of fluororesin particles | Amount of fluorine-based dispersing agent (parts by mass relative to 100 parts by mass of acrylic resin) | | Surface resistivity (Ω/square) | Environmental variation of surface resistivity (order of magnitude) |
| Example 1 | 24 | DIA, Malic acid/DIA, TOA, PP | 4.1 | 8.0 | 1 | Positive | $2 \times 10^{10}$ | 0.9 |
| Example 2 | 29 | DIA, Malic acid/DIA, TOA, PP | 4.9 | 7.9 | 1 | Positive | $6 \times 10^{9}$ | 0.3 |
| Example 3 | 39 | TOA, Acetic acid/DIA, TOA, PP | 6.4 | 7.8 | 1 | Positive | $3 \times 10^{10}$ | 0.8 |
| Example 4 | 15 | DIA, Malic acid | 2.5 | 8.1 | 1 | Positive | $4 \times 10^{9}$ | 0.2 |
| Example 5 | 39 | TOA, Acetic acid/DIA, TOA, PP | 6.4 | 7.8 | 1 | Positive | $2 \times 10^{9}$ | 0.1 |
| Example 6 | 39 | TOA, Acetic acid/DIA, TOA, PP | 6.4 | 7.8 | 1 | Positive | $3 \times 10^{9}$ | 0.1 |
| Comparative example 1 | 24 | DIA, Malic acid/DIA, TOA, PP | 4.4 | 0.0 | 0 | Negative | $7 \times 10^{10}$ | 1.3 |
| Comparative example 2 | 29 | DIA, Malic acid/DIA, TOA, PP | 5.3 | 0.0 | 0 | Negative | $5 \times 10^{10}$ | 1.2 |
| Comparative example 3 | 39 | TOA, Acetic acid/DIA, TOA, PP | 6.9 | 0.0 | 0 | Negative | $1 \times 10^{11}$ | 1.9 |
| Comparative example 4 | 29 | DIA, Malic acid/DIA, TOA, PP | 5.3 | 0.0 | 0 | Negative | $5 \times 10^{11}$ | 1.8 |
| Reference example | 17 | — | 3.3 | 0 | 0 | Positive | $2 \times 10^{10}$ | 0.8 |

The conductive agent particle content ratio denotes the content ratio (volume basis) of conductive tin oxide particles in the surface layer. The fluororesin particle content ratio denotes the content ratio (volume basis) of the particles comprising a fluororesin in the surface layer.

Evaluation Results

An explanation follows next on the evaluation results of examples and comparative examples given in Table 1.

In Examples 1 to 6, the value of the L function was always positive in the range of interparticle distance of 300 nm to 1 μm. Specifically, it is deemed that in the surface layers of Examples 1 to 6 the conductive tin oxide particles were distributed in the form of clusters, and conductive paths were formed efficiently by the conductive tin oxide particles. It is considered that the surface resistivity of these surface layers was lower as a result. It is further found that thanks to formation of conductive paths by conductive tin oxide particles in these surface layers, environmental variations in surface resistivity are less than one order of magnitude.

In all of Comparative examples 1 to 4 there were portions of negative value of the L function in the range of interparticle distance of 300 nm to 1 μm. That is, there are fewer conductive tin oxide particles present within the above range of interparticle distance, in the surface layers of Comparative examples 1 to 4, than in the case of a random distribution, and there are not formed sufficient conductive paths derived from the conductive tin oxide particles. It is considered that this results in higher surface resistivity. Moreover, the ratio of flow of electricity through the binder resin of the conductive tin oxide particles (groups), which arguably underlies ion conduction, increases due to the fact that no conductive paths are formed; it is considered that this gives rise to environmental variations of surface resistivity greater than one order of magnitude.

It is considered that the conductive tin oxide particles are highly dispersed, by the dispersing agent, in the coating materials that were used for forming the surface layers of Comparative examples 1 to 3. It is deemed that, as a result, the conductive tin oxide particles exhibited a regularly-spaced distribution state, and conductive paths did not develop sufficiently, in the surface layers.

By contrast, the coating material used for forming the surface layer according to Comparative example 4 was allowed to stand for 3 months after being prepared, and aggregates of conductive tin oxide particles became formed as a result in the coating material. Conductive tin oxide particle groups resulting from such aggregation exhibit a large size, such that no other conductive tin oxide particle groups can be present in a range of interparticle distance of 300 nm to 1 μm, it is deemed that, as a result, the L function is negative within the above range of interparticle distance. It is further deemed that sufficient conductive paths fail to be formed in the surface layer, and surface resistivity increases, due to the fact that the conductive tin oxide particles are present as aggregates in the surface layer, and the distance between aggregates is larger.

As explained above, at least one aspect of the present disclosure allows providing an electrophotographic member having a surface layer that utilizes conductive tin oxide particles as a conductive agent, and such that the surface resistivity of the surface layer is stably low. Also, at least one aspect of the present disclosure, allows providing an image forming apparatus having such an electrophotographic member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025006, filed Feb. 21, 2023, and Japanese Patent Application No. 2024-006660, filed Jan. 19, 2024 which are hereby incorporated by reference herein in theirs entirety.

What is claimed is:

1. An electrophotographic member having a base layer and a surface layer,
wherein the surface layer comprises
a binder resin; and
a plurality of particles comprising a conductive tin oxide, in the binder resin,
a content ratio of the particles comprising a conductive tin oxide, in the surface layer, is 2.0 to 10.0 vol %, and
a value of an L function denoting a relationship of a distribution of the particles comprising a conductive tin oxide, as observed from a surface of the surface layer, is always positive in a range of 300 nm to 1 μm of a distance from barycentric coordinates of the particles.

2. The electrophotographic member according to claim 1, wherein the surface layer further comprises particles comprising a fluororesin, and a dispersing agent dispersing the particles comprising a fluororesin,
the dispersing agent is a polymer having a structure represented by Formula (1) and a structure represented by Formula (2);

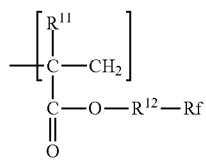

(1)

in Formula (1), $R^{11}$ represents a hydrogen atom or a methyl group, $R^{12}$ represents a single bond or an alkylene group having 1 to 3 carbon atoms, and Rf represents a perfluoroalkyl group having 1 to 6 carbon atoms;

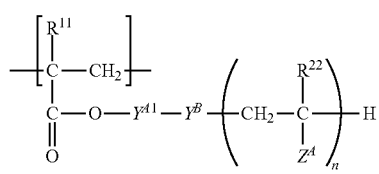

(2)

in Formula (2), $R^{21}$ and $R^{22}$ each independently represent a hydrogen atom or a methyl group, and $Y^{A1}$ represents an unsubstituted alkylene group,
$Y^B$ represents
an unsubstituted alkylene group,
an alkylene group substituted with a halogen atom,
an alkylene group substituted with a hydroxy group,
—COO—,
—NHCO—, or
—NHCOO—, or
a divalent linking group derived through combination of one or more selected from among these groups and bonds with —O— or —S—, or
a single bond,
$Z^A$ represents a structure represented by Formula (3), a cyano group or a phenyl group, and
n represents an integer of 25 to 150, and

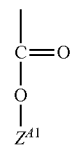

(3)

in Formula (3), $Z^{A1}$ represents an alkyl group having 1 to 4 carbon atoms.

3. The electrophotographic member according to claim 2, wherein the particles comprising a fluororesin comprise polytetrafluoroethylene particles.

4. The electrophotographic member according to claim 1, wherein a volume resistivity of a powder compact of the particles comprising a conductive tin oxide is 0.01 to 100 Ω·cm.

5. The electrophotographic member according to claim 4, wherein the volume resistivity is 1 to 5 Ω·cm.

6. The electrophotographic member according to claim 5, wherein a surface resistivity of the surface layer is $1\times10^9$ Ω/square to $1\times10^{11}$ Ω/square.

7. The electrophotographic member according to claim 4, wherein the particles comprising a conductive tin oxide comprise an antimony.

8. The electrophotographic member according to claim 1, wherein the binder resin comprises an acrylic resin.

9. The electrophotographic member according to claim 8, wherein the acrylic resin is at least one polymer selected from the group consisting of a pentaerythritol tri(meth)acrylate and a pentaerythritol tetra(meth)acrylate.

10. The electrophotographic member according to claim 1, wherein the electrophotographic member is an intermediate transfer member.

11. The electrophotographic member according to claim 1, wherein the electrophotographic member has an endless belt shape.

12. An electrophotographic image forming apparatus comprising:
an image bearing member supporting a toner image thereon; and
an intermediate transfer member onto which the toner image formed on the image bearing member is primary-transferred, and which secondary-transfers, onto a recording material, the primary-transferred toner image, wherein the intermediate transfer member is the electrophotographic member according to claim 1.

* * * * *